Oct. 26, 1926.
F. FEHR
1,604,687
JAR OPENER
Filed April 15, 1926
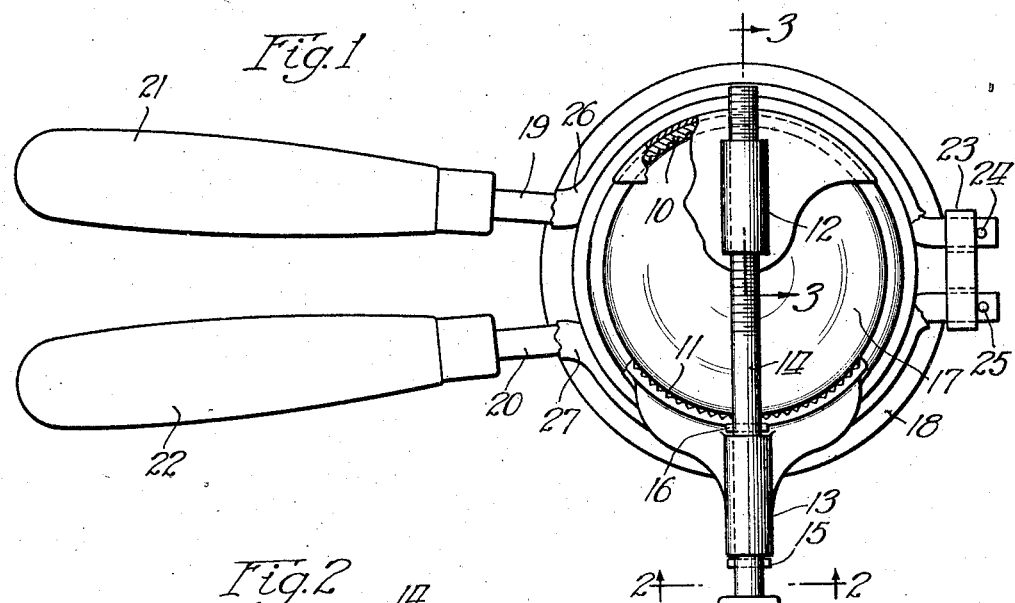
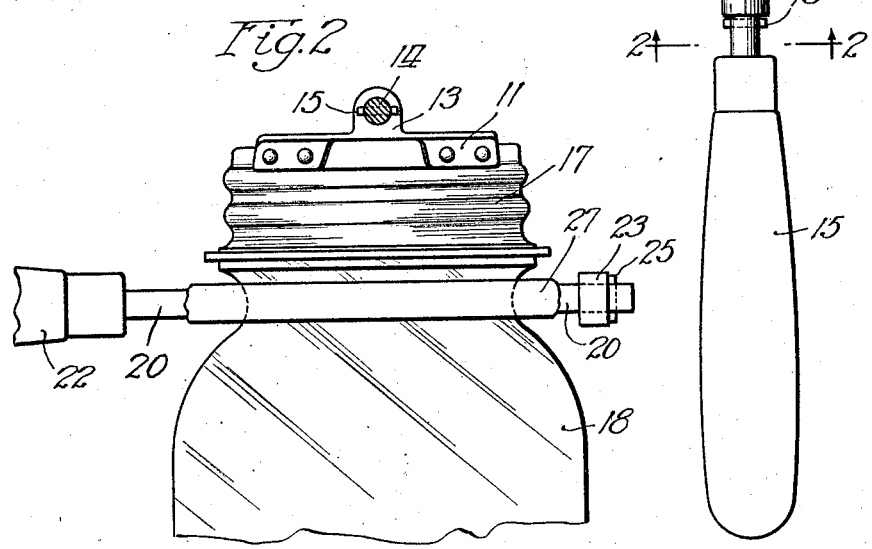
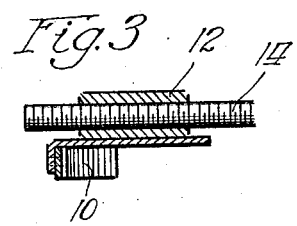
Inventor
Frank Fehr Patented Oct. 26, 1926.

1,604,687

UNITED STATES PATENT OFFICE.

FRANK FEHR, OF EVANSTON, ILLINOIS.

JAR OPENER.

Application filed April 15, 1926. Serial No. 102,296.

My invention relates to jar openers, and more particularly to that class of jar openers which are of use in connection with jars such as the well-known Mason jar.

More particularly my invention concerns itself with the provision of means whereby the screwthreaded covers of jars may be readily removed even though they have become firmly attached to the jar. By means of my invention, the possibility of injury to the hand is obviated in those cases where jars fracture and break upon the removal or attempted removal of a tight or frozen cover. I am using the word "frozen" to indicate the cover that has tightened into position more strongly than is or was anticipated.

My invention concerns itself more particularly with the provision of a device which is easily placed in position upon a can cover and which, when in position, may be readily tightened by the manipulation of the handle which supports the device. The device may then be turned and the cover opened as the device affords the necessary increased leverage to loosen the frozen cover.

In accordance with another feature of my invention, I provide suitable means by virtue of which the jar or can itself may be held so that the hands do not need to come into contact with either the jar or the cover, thus obviating all danger of possible injury.

My invention, of course, is of use not only in preventing possible injury, but in providing necessary means for removing frozen covers from jars in a simple and expeditious manner without resorting to other and more complicated methods heretofore employed.

I will describe my invention more in detail by referring to the accompanying drawing in which—

Fig. 1 is a top view of a jar and cover with my improved means shown in position ready for use;

Fig. 2 is a sectional view on line 2—2 of Fig. 1; and

Fig. 3 is a fragmentary sectional view along line 3—3 of Fig. 1.

Referring now to the drawings, my invention consists in the provision of a pair of jaws 10 and 11 which, in this instance, are shown as attached to suitable large flat carriers 12 and 13, respectively, which jaw carriers are supported by a rod 14. This rod 14 terminates in a handle 15. The jaw supports 12 and 13, in this particular instance, also have portions projecting from the sides thereof opposite said jaws and forming bearings for the rod 14, the rod 14 being freely rotatable in the jaw support 13 but having screw-threaded engagement with the jaw support 12. The rod 14 is prevented from longitudinal movement along the support 13 by pins 15 and 16 as shown. The jaws themselves have a circular serrated face so that they are better enabled to grasp the metal cover when the device is used in connection with a metal cover. These serrations are clearly indicated in Figs. 1 and 3.

Now whenever it is desired to move the can cover 17 from the jar 18, then the device is mounted in the position shown in Fig. 1 and the handle 15 rotated so as to clamp the jaws tightly into position at the top portion of the cover 17. The jar 18 may now be firmly grasped and the additional leverage provided by the use of the handle 15 will enable prompt removal of the cover 17 even though it should be frozen into place.

Now in order to avoid possible injury due to breakage of the jar, I have provided means whereby the jar may be suitably held without subjecting it to undue strain. These holding means are of such character that the hand is entirely free from contact with the jar and these holding means consist of two rods 19 and 20 which near one extremity are bent into circular form to the outline of a jar. These rods 19 and 20 terminate in handles 21 and 22, respectively. The opposite extremities of the bars 19 and 20 are loosely passed through a heel piece 23 and held against removal therefrom by the pins 24 and 25. I also find it desirable to cover these rods where they come in contact with the jar with tubes of rubber 26 and 27, thus to avoid any undue strain being placed upon the jar. The rods 19 and 20 being rounded at those points where they come into contact with the jar grasp practically the entire periphery of the jar and thus hold it in a manner which relieves it of undue strain.

It will be thus seen that the device having the handles 21 and 22 serves as a convenient holder for jars of this character, and that when it is mounted in position as shown in Figs. 1 and 2 and the jar opener mounted in position as shown in these same figures, that the necessary leverage is obtained to open the most tightly fitting cap or cover.

From what has thus been described, the nature of my invention will be readily clear to those skilled in the art, and it will be also understood that modifications may be made without departing from the spirit thereof, and what I therefore claim as new and desire to claim by Letters Patent is:

1. A device of the character described comprising a pair of jaw supports, a jaw for each support, said jaws each having a rounded face so that they are adapted to grasp a circular object, a handle, and means carried by said handle on which said jaws are mounted, said means having screwthreaded engagement with one of said jaw supports whereby said jaws may be clamped and unclamped from said circular object.

2. A device of the character described comprising a pair of jaw supports, a jaw for each support projecting from one side thereof, said jaws each having a rounded face so that they are adapted to grasp a circular object, a handle, a rod projecting from said handle, said jaw supports each having a portion projecting from the side thereof opposite the jaw thereon, one of said projections being adjustable longitudinally on said rod and the other being rotatably mounted on said rod whereby said jaws may be clamped and unclamped from said circular object.

3. A device of the character described comprising a pair of jaw supports, a serrated jaw for each support, said jaws each having a rounded face so that they are adapted to grasp a circular object, a handle, and means carried by said handle on which said jaws are mounted, said means having screwthreaded engagement with one of said jaw supports whereby said jaws may be clamped and unclamped from said circular object.

4. A device of the character described comprising a pair of jaw supports, a jaw for each support, said jaws each having a rounded face so that they are adapted to grasp a circular object, a handle, and means carried by said handle on which said jaws are mounted, said means having screwthreaded engagement with one of said jaw supports and having rotational engagement with the other of said jaw supports whereby said jaws may be clamped and unclamped from said circular object.

5. A device of the character described comprising a pair of jaw supports, a serrated jaw for each support said jaws each having a rounded face so that they are adapted to grasp a circular object, a handle, and means carried by said handle on which said jaws are mounted, said means having screwthreaded engagement with one of said jaw supports and having rotational engagement with the other of said jaw supports whereby said jaws may be clamped and unclamped from said circular object.

6. A device of the character described comprising a handle, a rod projecting from said handle, a jaw support pivotally associated with said handle, means for preventing longitudinal movement between said rod and said jaw support, a serrated jaw having a circular face carried by said jaw support, a second jaw support having screwthreaded engagement with said rod, and a serrated jaw carried by said second jaw support having a circular bearing face.

In witness whereof, I hereunto subscribe my name this 10th day of April, A. D. 1926.

FRANK FEHR.